United States Patent [19]

Mitchell et al.

[11] 3,798,903

[45] Mar. 26, 1974

[54] EXHAUST REACTOR MANIFOLD

[75] Inventors: Harry R. Mitchell, Bloomfield Hills; Hal H. Rice, Birmingham; James R. Abel, Sterling Heights, all of Mich.

[73] Assignee: General Motors Corporation, Detroit, Mich.

[22] Filed: Dec. 29, 1972

[21] Appl. No.: 319,482

[52] U.S. Cl............................ 60/282, 60/272, 60/322, 60/323, 285/187
[51] Int. Cl............................................ F01n 3/10
[58] Field of Search ............. 60/272, 282, 302, 322, 60/323; 181/40; 285/187, 150

[56] References Cited
UNITED STATES PATENTS

| | | | |
|---|---|---|---|
| 3,248,188 | 4/1966 | Chute | 60/311 |
| 3,488,723 | 1/1970 | Veazie | 60/282 |
| 3,709,772 | 1/1973 | Rice | 60/272 |
| 3,168,936 | 2/1965 | Gordon | 181/40 |

*Primary Examiner*—Douglas Hart
*Attorney, Agent, or Firm*—Robert J. Outland

[57] ABSTRACT

An exhaust reactor manifold having a housing defining a reaction chamber formed of hardened insulative ceramic, supported and secured to the engine by a plurality of columnar compression members loaded by bolt means, with spring washers to provide for relative expansion. Exposed portions of the ceramic housing are protected by a metal cover spaced from the housing surface by a layer of resilient fibrous insulation which permits relative expansion of the housing and cover and reduces heat loss from the housing. Imposition of folds from other exhaust system components on the manifold is avoided by supporting the exhaust pipe on an engine mounted bracket with an adapter arrangement for making the exhaust connection.

5 Claims, 5 Drawing Figures

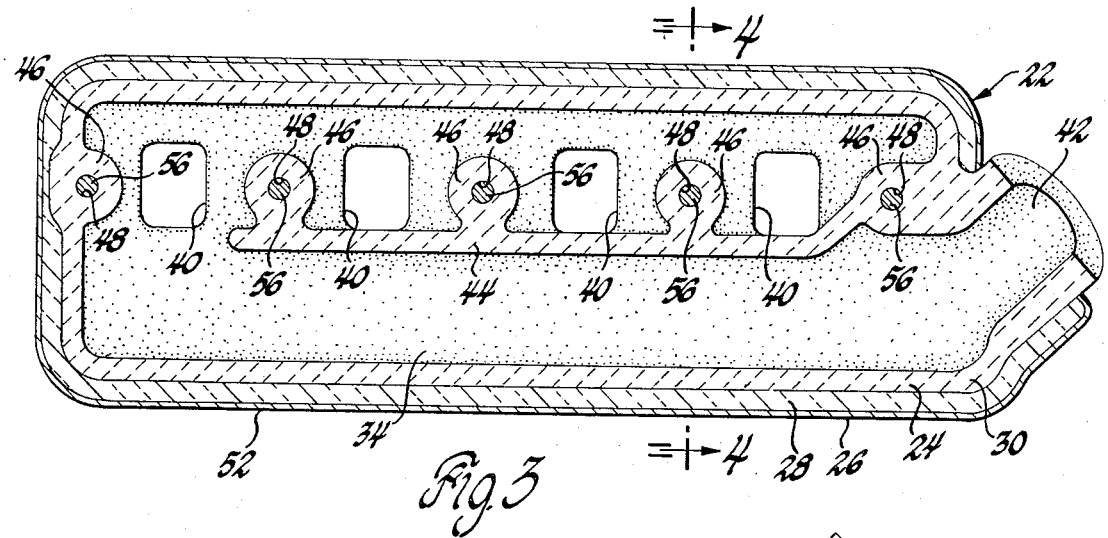
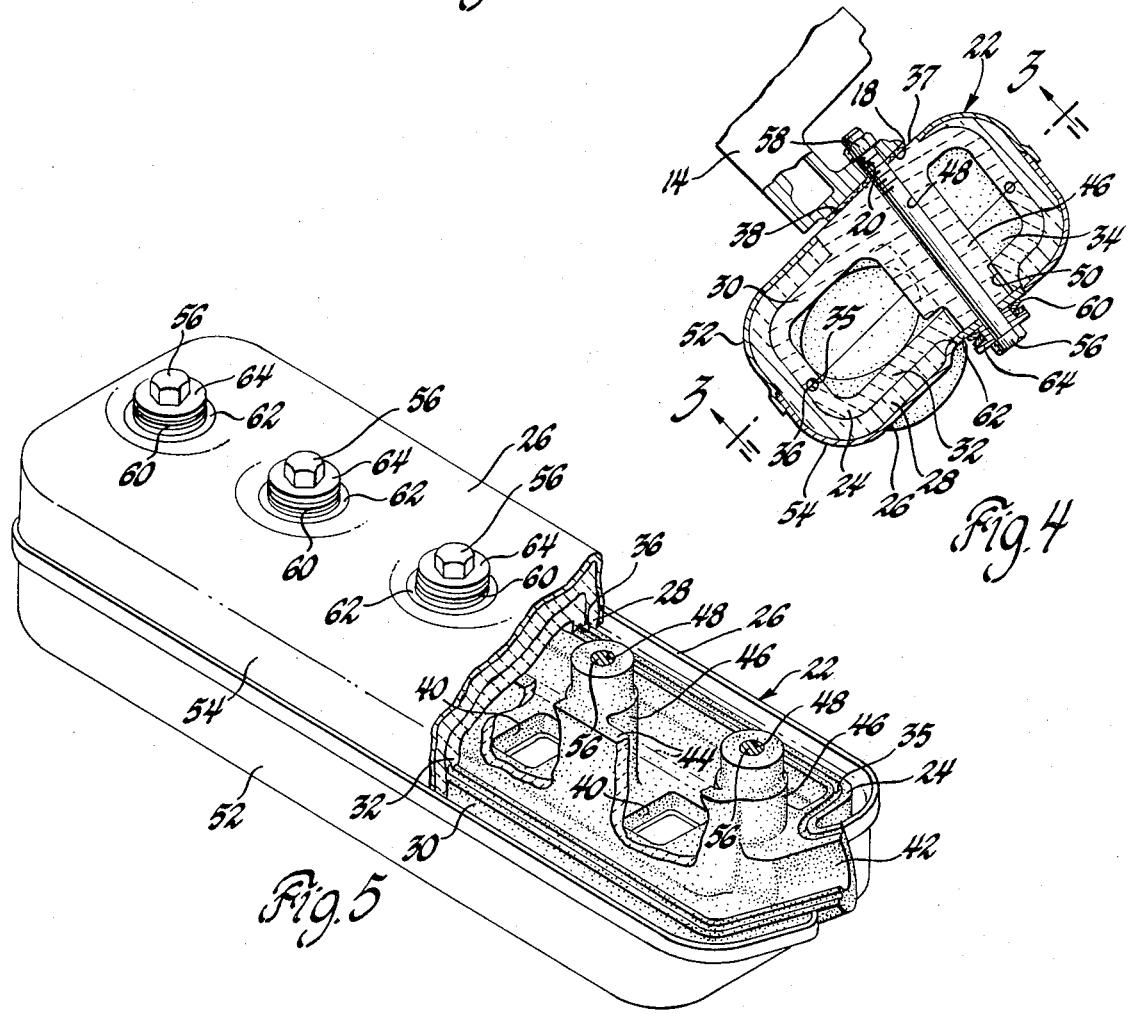

EXHAUST REACTOR MANIFOLD

BACKGROUND OF THE INVENTION

This invention relates to ceramic exhaust reactors for use with internal combustion engines and more particularly to exhaust reactor manifold constructions having a self-supported ceramic housing designed for compression loading of the main support elements.

It is known in the art relating to exhaust reactors that certain hardened insulative ceramics have insulating and wear-resisting properties at high temperatures which make them desirable for use in exhaust reactors for internal combustion engine exhaust gases. At the same time, ceramic materials are relatively brittle, compared to metals, and therefore may be broken due to rough handling or the application of excessive stresses, such as might be applied by differential expansion rates with metal components with which the ceramics are associated. Also, mounting stresses and the shock loads of normal engine and vehicle operation may be excessive if they create tensile stresses on any portion of the ceramic body, since ceramic members are considerably stronger in compression than in tension.

The present invention provides a ceramic exhaust reactor manifold construction in which the reaction chamber defining portions and main load-carrying elements are formed of hardened insulative ceramics arranged to take all major forces in compression and to eliminate stresses due to differential expansion with associated metal components.

The invention further provides additional insulating and protecting cover members which shield the reactor body from accidental breakage due to external shock and reduce heat loss. These and other features of the invention will be more fully understood from the following description of a preferred embodiment, taken together with the accompanying drawings.

BRIEF DESCRIPTION OF THE DRAWINGS

In the drawings:

FIG. 3 is a longitudinal cross-sectional view showing part of the interior structure of the reactor of FIG. 1 taken in the plane generally indicated by the line 3—3 of FIG. 4;

FIG. 4 is a transverse cross-sectional view showing the reactor internal construction taken in the plane generally indicated by the line 4—4 of FIG. 3; and FIG. 5 is a perspective view of the reactor assembly partially broken away to show certain aspects of the interior construction.

DESCRIPTION OF THE PREFERRED EMBODIMENT

Figure 1:
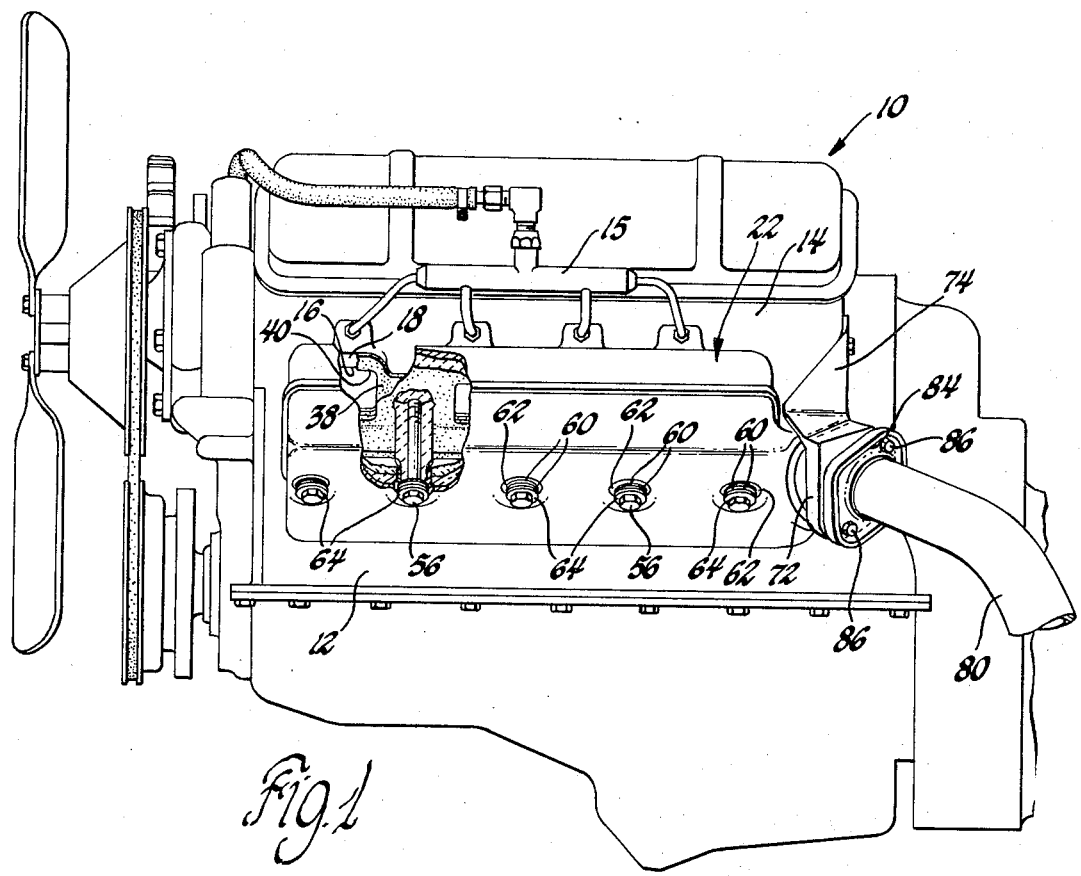
FIG. 1 is a side view of an internal combustion engine having a reactor manifold according to the invention.

Referring now in detail to the drawings, numeral 10 generally indicates an internal combustion engine which could be of any of numerous forms of construction, but in this instance is shown as a conventional, 8-cylinder, V-type automobile engine. Engine 10 is provided with a cylinder block 12 having a pair of cylinder banks, only one being shown, on the outer ends of which are mounted cylinder heads 14 closing the ends of the cylinder.

In the interior, not shown, of the cylinder heads 14, are provided the usual intake and exhaust passages for respectively admitting fuel mixture to and conducting spent exhaust gases from the engine combustion chambers. External air injection manifolds 15 are mounted on the cylinder heads and connect with the exhaust passages for supplying secondary reaction air to the exhaust gases for further reaction in known manner. The cylinder head exhaust passages terminate in spaced discharge ports 16, which open through an exhaust manifold mounting surface 18 provided along one side of each cylinder head. A plurality of bolt receiving openings 20 are also provided in each cylinder head, opening through the manifold mounting surface 18 for the purpose of securing a manifold to the cylinder head, as will be subsequently more fully described.

Engine 10 is provided with a pair of exhaust reactor manifolds, one for each cylinder bank, the drawings showing only the left-hand manifold 22. Manifold 22 is made up of a ceramic housing or liner 24, a steel sheet metal outer cover 26 and a layer 28 of compressible insulation retained between the cover 26 and the housing 24.

The housing 24 is formed of suitable hardened insulative ceramic material and is made up of inner and outer portions 30, 32, respectively, cemented together to define a longitudinally extending internal reaction chamber 34. Grooves 35, 36 may be formed along the abutting edges of two portions 30, 32 for receiving a cement mixture to be subsequently described.

The inner portion of the housing is provided on its inner wall with a longitudinally extending mounting boss 37. In assembly boss 37 is secured against the engine manifold mounting surface 18 with a high temperature gasket 38 of suitable asbestos-based or other material, sealing the contacting surfaces. A plurality of inlet ports 40 extend through the mounting boss part of the inner wall of the housing inner portion, ports 40 connecting in assembly with the exhaust discharge ports 16 of the engine cylinder head and forming passages through which exhaust gases are passed from the engine exhaust passages into the reaction chamber 34 of the exhaust manifold reactor.

At one end of the housing, an outlet port 42 is formed, partially in both the inner and outer portions of the housing, for the purpose of conducting exhaust gases out of the reaction chamber. A longitudinally extending baffle 44 divides the reaction chamber horizontally from adjacent the outlet port 42 to near the opposite end so that gases entering the reaction chamber through the ports 40 must travel at least almost the full length of the reaction chamber and in some cases nearly twice the length of the reaction chamber in order to pass from the inlets to the outlet.

Housing 24 is supported by five transversely extending compression columns 46 which are formed integral with the inner porition of the housing and are disposed intermediate and adjacent the exhaust inlet ports 40. Columns 46 include centrally disposed longitudinal openings 48 and extend outwardly through openings 50 in the outer portion 32 of the housing, the joint therebetween being sealed by cement upon assembly of the two housing portions.

The sheet metal protective cover 26 is formed of inner and outer portions 52, 54, respectively, for ease of assembly. The cover surrounds and protects the outer portions of the housing 24, with the exception of those portions secured to or engaged by other elements; specifically, the mounting boss 37, the outer ends of the columns 46, and the end of the outlet port 42. At all points, except at its edges adjacemt the above-mentioned locations, the cover is spaced from the outer surface of the housing 24 and the space is filled with a layer 28 of compressible, high-temperature insulating material; for example, a fibrous alumina-silica material available commercially from the Carborundum Company under the trade name, Fiberfrax, or a combination of such material and plain fiberglass.

Manifold 22 is secured to the engine cylinder head manifold mounting surface 18 by means of mounting bolts 56 which extend through the central openings 48 in the columms 46 and are secured in the bolt openings 20 in the cylinder head by means of nuts 58. Between the heads of the bolts 56 and the outer ends of the columns 46, there are provided a plurality of spring washers 60 which are partially compressed between an inner washer 62 and an outer formed washer 64. This arrangement places the compression members under load while permitting relative motion between the parts so that relative expansion of the ceramic elements and the bolts may take place without substantially changing the load on the ceramic elements. This manner of construction and support has the advantage that the major loads are taken by columns 46 in compression and the columns in turn support the remaining parts of the housing and manifold assembly with tensile loads being minimized. In this way, the high compressive strength of the ceramic is taken best advantage of and a dependable construction is provided.

Figure 2:
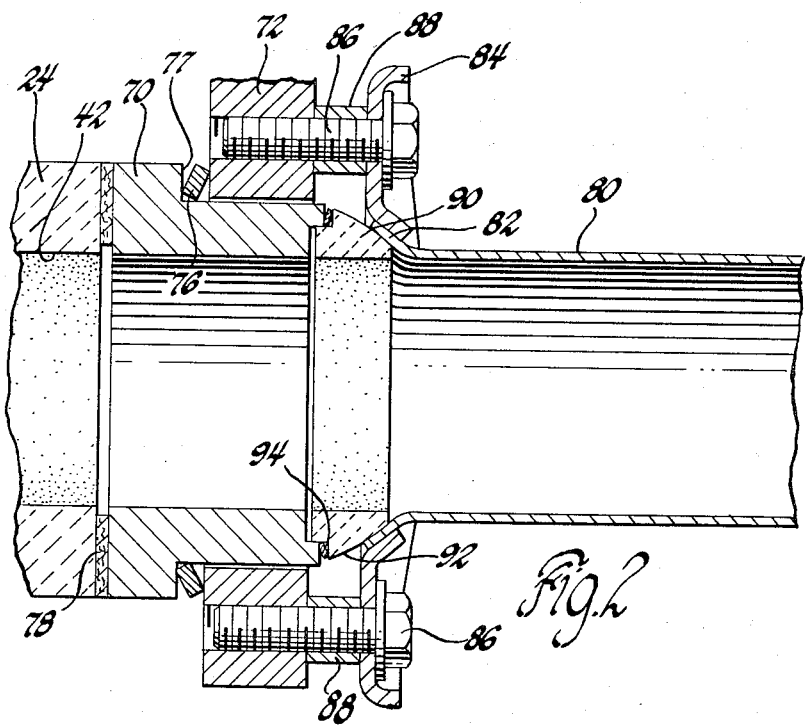
FIG. 2 is a cross-sectional view showing the means of connecting the exhaust pipe with the reactor on the engine of FIG. 1 and the exhaust pipe supporting means.

The disclosed engine-manifold assembly is provided with a novel bracket and adapter arrangement best shown in FIGS. 1 and 2 to provide for connection of an exhaust pipe with the reactor manifold without causing undesirable stresses in the manifold itself. The mounting arrangement includes a tubular adapter 70 which is supported by the encircling ring portion 72 of an engine-mounted bracket 74. A first Belleville spring 76 acts between the ring portion 72 and a flange 77 of the adapter 70 to urge the adapter into sealing engagement with the end of the manifold outlet port 42, the joint being sealed by a suitable gasket 78.

The exhaust pipe 80 terminates in an outwardly flared portion 82, having fixed thereto a formed flange 84 which is in turn secured to the ring portion 72 of the engine-mounted bracket by means of bolts 86 and spacers 88. A second adapter member 90 interlocks with the end of the first adapter 70 and includes a spherical sealing surface 92 which is biased into engagement with the flared portion 82 of the exhaust pipe by means of a second Belleville washer 94 acting between the two adapters.

With this arrangement, the exhaust pipe 80 is supported directly by the engine-mounted bracket 74, with gas sealing being taken care of by the overlapping and interlocking construction of the first and second adapters 70, 90 and the sealing engagement of these adapters with the manifold outlet ports 42 and the exhaust pipe flared portion 82, respectively. The Belleville springs 76, 94 provide the seating forces in each instance. Thus, the arrangement avoids subjecting the exhaust reactor manifold to either dynamic or static loads of the exhaust pipe and its connecting exhaust system. In addition, the sealing forces on the ceramic exhaust outlet port are limited to the force caused by the laoded Belleville washers 76, 94 and thus may be controlled within the limits of the ceramic material.

It is, of course, within the contemplation of this invention that any suitable materials and methods of construction may be utilized to form a manifold in accordance with the present invention. While most of the components have been constructed using well-known techniques, certain procedures have been developed for making the inner housings or liners which may differ from well-known practices. Disclosure of these techniques is, accordingly, believed desirable, although it should be understood that there is no intenion to limit the manner by which these parts may be constructed within the scope of this invention.

TABLE I

Some Low Shrinkage Lithia-Alumina-Silicate Compositions

| | 1<br>Parts by Wt. | 2<br>Parts by Wt. |
|---|---|---|
| Beta Spodumene* (calcined alpha spodumene) | 95 | 90 |
| Todd Light Ball Clay** | 5 | 10 |
| $H_2O$ | 39 | 39 |
| $Li_2CO_3$ | 0.5 | 0.5 |

* $Li_2O \cdot Al_2O_3 \cdot 4SiO_2$ with about 7.1% $Li_2O$; 92% −325 mesh, 7% +325 mesh and 1% +200 mesh.
** About 57.5% $SiO_2$, 25.9% $Al_2O_3$, 1.3% $TiO_2$, 1.2% $Fe_2O_3$, 0.5% CaO, 0.7% MgO, 1.6% $K_2O$, 0.4% $Na_2O$ with loss on ignition 10.8%. Particle size, 98% finer than 20 microns and 68% finer than 1 micron.

Ceramic housings suitable for manifolds of the type disclosed may be made from material such as ceramic fused silica (composed of greater than 99 percent $SiO_2$) and certain low-expansion lithia-alumina-silicate compositions such as shown in Table I. These materials have adequate strength, relatively low thermal conductivity and excellent thermal shock and thermal stress resistance as a result of their very low thermal expansion. Special slip casting techniques using plaster molds were developed to fabricate housing parts from these low expansion materials. These techniques were made necessary by the irregular shape of the housing parts, coupled with poor mold release characteristics of the materials used. The latter exist because of the low drying shrinkage and, in the case of the ceramic-fused silica materials, the formation of a bond between the plaster mold and the colloidal silica in the fused silica casting slip.

TABLE II

Characteristics of Fused Silica* Casting Slip

| | Range |
|---|---|
| Solids, % | 81.8–82.8 |
| pH | 4.8–5.4 |
| Viscosity, centipoises | 185–265 |
| Settling rate (mm) 1 hour | 0.9–1.0 |
| 5 hours | 1.17–1.27 |
| Particle size, % finer than | |
| 40 microns | 92–86 |
| 20 microns | 73–69 |
| 10 microns | 54–51 |
| 5 microns | 38–35 |
| 2 microns | 24–20 |
| 1 micron | 15–12 |

* 99+% $SiO_2$

We have found that the intricately shaped housing parts can be released and removed from plaster molds when cast from fused silica casting slip having characteristics as shown in Table II, provided that (a) the plaster molds are made with air ducts through which air pressure may be applied between the surfaces of the mold and the finished part, and (b) a permeable parting film is used. The latter is applied, for example, by exposing the mold surfaces for ten minutes with a 0.1 to 1 percent aqueous solution of sodium alginate which leaves a suitable permeable parting material on the surfaces of the mold cavity. Thereafter, following a conventional casting step with the disclosed materials, application of 50 psi air pressure through the mold ducting causes the water removed from the slip by the mold to act as a fluid medium to effect release of the cast piece from the mold. The sodium alginate film adheres to the cast piece when the casting is removed in this manner.

After the housing parts have dried, the inside and outside parts are assembled together with cement and the cemented assembly is sintered. Useful cements are made from essentially the same ingredients as the cast parts except a coarse fraction (200 mesh) is substituted for about 50 percent of the fine minus 325 mesh material so as to avoid shrinkage cracks. Colloidal silica is added to the cement to enhance the cementing action. In the case of the fused silica material, about 5 percent of colloidal silica is added to the cement and the cemented liners are fired at 2,050° for 6 hours in an oxidizing atmosphere of air or natural gas combustion products preferably containing about 27 percent water vapor for best strength development. With lithia-alumina-silicate compositions, about 10 percent of colloidal silica is added to the cement and the cemented liners are sintered at 2,425° – 2,450° F for one hour in air.

While the invention has been described by reference to a specific preferred embodiment, the scope of the invention is not intended to be limited except by the following claims:

1. An exhaust reactor manifold for an internal combustion engine, said manifold having a hardened insulative ceramic housing defining an enlarged exhaust gas reaction chamber, said housing including
   a mounting boss along one wall adapted to sealingly engage a manifold mounting surface of such engine,
   a plurality of inlet ports through said mounting boss,
   an outlet port in said housing distant from said inlet ports, and
   a plurality of spaced columns extending across said housing at points intermediate and adjacent said inlet ports, said columns having central axial openings through which manifold mounting bolts may extend, said columns forming compression members which are axially loaded upon securing said manifold to such engine and which constitute the primary means for supporting said manifold.

2. An exhaust reactor manifold for an internal combustion engine, said manifold comprising
   a hardened insulative ceramic housing defining an enlarged exhaust gas reaction chamber, said housing having a mounting boss along one wall adapted to sealingly engage the manifold mounting surface of such engine, a plurality of inlet ports through said mounting boss, an outlet port in said housing distant from said inlet ports, and a plurality of spaced columns extending across said housing at points intermediate and adjacent said inlet ports, said columns having central axial openings through which manifold mounting bolts may extend, said columns forming compression members which are axially loaded upon securing said manifold to such engine and which constitute the primary means for supporting said manifold,
   a sheet metal protective cover surrounding and protecting the exposed surfaces of said housing, said cover being spaced from the walls of said housing except adjacent said mounting boss, said columns and said outlet port, and
   a layer of fibrous thermal insulation in the space between said housing and said cover, said insulation layer supporting said cover on said housing and yielding to permit relative thermal expansion and contraction of said housing and cover and to absorb shock loads on said cover.

3. In an internal combustion engine, the combination of,
   a structural member defining an exhaust manifold mounting surface, a plurality of spaced exhaust discharge ports opening through said surface and a plurality of bolt receiving openings through said surface and spaced intermediate and adjacent said discharge ports.
   a hardened insulative ceramic housing defining an enlarged exhaust gas reaction chamber, said housing having a mounting boss along one wall sealingly engaging said manifold mounting surface, a plurality of inlet ports through said wall in said mounting boss and connecting said discharge ports with said reaction chamber to pass engine exhaust gases into said reaction chamber, an outlet port in said housing distant from said inlet ports to permit the escape of reacted exhaust gases from said reaction chamber, said housing being formed from separate inner and outer sections cemented together in assembly along a plane generally parallel to said mounting boss and traversing said reaction chamber, said inner section including said mounting boss, said inlet ports and a plurality of integral spaced columns extending normally from said mounting boss, one of said columns aligned with each of said engine bolt receiving openings and said columns having central axial openings aligned with said bolt openings, said outer section having an outer wall with a plurality of openings therethrough in which the outer ends of said columns are sealingly received,
   a sheet metal protective cover surrounding and protecting the exposed surfaces of said housing, said cover being spaced from the walls of said housing except adjacent said mounting boss and said columns,
   a layer of compressible thermal insulation in the space between said housing and said cover, said insulation layer supporting said cover on said housing and yielding to permit relative thermal expansion and contraction of said housing and cover and to absorb shock loads applied to said cover, and
   retaining means engaging the outer ends of said columns and applying compressive loads thereto to maintain said housing in place on said manifold mounting surface, said retaining means including bolt means extending through said columns and secured in said manifold mounting surface bolt receiving openings and loaded spring washers between said bolt means and said column outer surfaces to permit relative expansion of said columns and said bolt means without unduly varying the compressive load on said columns.

4. The combination of claim 3 and further comprising
- an exhaust pipe for receiving exhaust gases from said housing outlet port, said exhaust pipe having an outwardly flared end and a mounting flange secured at said end,
- a bracket secured to said engine in fixed relation to said structural member, said bracket including a ring portion spaced opposite said outlet port,
- a first tubular adapter movably supported within said bracket ring portion, said adapter having one end sealingly engageable with the end of said outlet port,
- first biasing means between said adapter and said ring portion and yieldably urging said adapter into sealing engagement with said outlet port end,
- a second tubular adapter telescopingly engaging at one end said first adapter to form a slidable sealed joint therewith, said second adapter having its other end sealingly engageable with the flared portion of said exhaust pipe,
- means fixedly securing said exhaust pipe to said bracket ring portion, and
- second biasing means between said first and second adapters and yieldingly urging said second adapter into sealing engagement with said exhaust pipe.

5. In combination
- an internal combustion engine having a cylinder block and head assembly,
- an exhaust reactor manifold adapted to receive exhaust gases from said block and head assembly, said manifold having main support columns and gas passage defining portions formed from ceramic materials,
- means securing said manifold to said block and head assembly, said securing means maintaining a compressive load on said support columns and including yieldable elements to permit relative expansion of said manifold and said columns in service while maintaining said compressive load relatively constant,
- an exhaust pipe adapted to receive exhaust gases from said manifold,
- bracket means fixedly supporting said exhaust pipe on said block and head assembly and in spaced relation to said manifold, and
- adapter means supported by said bracket means and including first and second telescoping members sealingly engageable with said manifold and said exhaust pipe respectively to conduct exhaust gases therebetween, and adapter means including biasing means yieldably urging said telescoping members into such sealing engagement.

* * * * *